(12) United States Patent
McCallam (10) Patent No.: US 8,201,249 B2
(45) Date of Patent: Jun. 12, 2012

(54) STEADY STATE COMPUTER INTRUSION AND MISUSE DETECTION

(75) Inventor: Dennis Hain McCallam, Reisterstown, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1330 days.

(21) Appl. No.: 10/437,401

(22) Filed: May 14, 2003

(65) Prior Publication Data

US 2004/0230834 A1 Nov. 18, 2004

(51) Int. Cl.
*G06F 11/30* (2006.01)
(52) U.S. Cl. ......................................................... 726/23
(58) Field of Classification Search ................... 726/23, 726/22
See application file for complete search history.

(56) References Cited

U.S. PATENT DOCUMENTS

| | | | | |
|---|---|---|---|---|
| 5,621,889 | A * | 4/1997 | Lermuzeaux et al. | 726/22 |
| 5,689,587 | A * | 11/1997 | Bender et al. | 382/232 |
| 6,088,804 | A * | 7/2000 | Hill et al. | 726/25 |
| 6,252,963 | B1 | 6/2001 | Rhoads | |
| 6,301,360 | B1 | 10/2001 | Bocionek et al. | |
| 6,314,192 | B1 | 11/2001 | Chen et al. | |
| 6,321,338 | B1 * | 11/2001 | Porras et al. | 726/25 |
| 6,405,318 | B1 * | 6/2002 | Rowland | 726/22 |
| 6,648,820 | B1 * | 11/2003 | Sarel | 600/300 |
| 6,681,331 | B1 * | 1/2004 | Munson et al. | 726/23 |
| 6,711,127 | B1 * | 3/2004 | Gorman et al. | 370/230 |
| 6,741,758 | B2 * | 5/2004 | Hayashi et al. | 382/294 |
| 7,020,802 | B2 * | 3/2006 | Gross et al. | 714/39 |
| 7,043,549 | B2 * | 5/2006 | Breese et al. | 709/224 |
| 7,089,592 | B2 * | 8/2006 | Adjaoute | 726/25 |
| 7,150,043 | B2 * | 12/2006 | Brock et al. | 726/23 |
| 7,171,689 | B2 * | 1/2007 | Beavers | 726/22 |
| 7,234,168 | B2 * | 6/2007 | Gupta et al. | 726/25 |
| 7,269,651 | B2 * | 9/2007 | Olsson et al. | 709/224 |
| 7,290,283 | B2 * | 10/2007 | Copeland, III | 726/25 |
| 7,363,656 | B2 * | 4/2008 | Weber et al. | 726/23 |
| 7,409,721 | B2 * | 8/2008 | Hernacki et al. | 726/25 |
| 7,512,981 | B2 * | 3/2009 | Pearson | 726/23 |
| 7,549,166 | B2 * | 6/2009 | Baffes et al. | 726/23 |
| 7,624,444 | B2 * | 11/2009 | Gupta et al. | 726/23 |
| 7,721,336 | B1 * | 5/2010 | Adjaoute | 726/25 |
| 7,941,854 | B2 * | 5/2011 | Baffes et al. | 726/23 |
| 8,086,720 | B2 * | 12/2011 | Breese et al. | 709/224 |

FOREIGN PATENT DOCUMENTS

WO WO 03083660 A1 * 10/2003

* cited by examiner

*Primary Examiner* — Zachary A Davis
(74) *Attorney, Agent, or Firm* — Andrews Kurth LLP (57) ABSTRACT

A system and method provide for detecting intrusion and misuse of a computer in a computer network. The system includes an agent manager that directs actions of software agents to collect computer performance parameters from the computer, and a data analyzer that summarizes the collected computer performance parameters and generates a user profile. The system further includes a comparator that compares the summarized computer performance data and the user profile and generates a prompt based on a set of criteria related to the computer performance data and the user profile.

25 Claims, 11 Drawing Sheets

STEADY STATE COMPUTER INTRUSION AND MISUSE DETECTION

TECHNICAL FIELD

The technical field is systems and methods designed to protect the security of computer information, specifically systems and methods for detecting intrusion and misuse of computers.

BACKGROUND

A personal computer and a modem access to the Internet are all the tools that a computer hacker needs to conduct a cyber attack on a computer system. The rapid growth of a computer-literate population provides millions of people the opportunity to possess skills necessary to conduct a cyber attack. The computer literate population includes recreational hackers who attempt to gain unauthorized electronic access to information and communication systems. These computer hackers are often motivated only by personal fascination with hacking as an interesting game. Criminals, and perhaps organized crime, might also attempt personal financial gain through manipulation of financial or credit accounts or stealing services. Industrial espionage can also be the reason for a cyber attack on a competitor's computer system. Terrorists may attempt to use the computer infrastructure. Other countries may use the computer infrastructure for national intelligence purpose. Finally, there is the prospect of information warfare, which is a broad, orchestrated attempt to disrupt a United States military operation or significant economic activity.

A typical secure computer network has an interface for receiving and transmitting data between the secure network and computers outside the secure network. The interface may be a modem or an Internet Protocol (IP) router. Data received by the modem is sent to a firewall, which is a network security device that only allows data packets from a trusted computer to be routed to specific addresses within the secure computer network. Although the typical firewall is adequate to prevent outsiders from accessing a secure network, hackers and others can often breach a firewall. This can occur by cyber attack where the firewall becomes overwhelmed with requests and errors are made permitting access to an unauthorized user. As can be appreciated, new ways of overcoming the security devices are developed every day. An entry by an unauthorized user into the secure computer network, past the firewall, from outside the secure computer network is an intrusion.

Another type of unauthorized operation is a misuse, which is an unauthorized access from a computer within the secure computer network. In a misuse, the firewall is not breached. Instead, the unauthorized operation occurs from inside the secure computer network. A misuse can be detected when an authorized user performs an unauthorized, or perhaps, infrequent operation, which may raise the suspicion that an authorized user's computer is being misused. For example, an unauthorized user could obtain the password of an authorized user, logon to the secure computer network from the authorized user's computer, and perform operations not typically performed by the authorized user.

Security and intrusion detection systems exist that can determine if a breach of computer security is occurring. Some existing computer security systems have passive audit capabilities. These systems collect audit information from network devices and format those audits for review. Intrusion and misuse of computer systems with these computer security systems cannot, therefore, operate in real-time, or even in near real-time.

SUMMARY

What is disclosed is a system for detecting intrusion and misuse of a computer in a computer network. The system includes an agent manager that directs actions of software agents to collect computer performance parameters from the computer, and a data analyzer that summarizes the collected computer performance parameters and generates a user profile. The system further includes a comparator that compares the summarized computer performance data and the user profile and generates a prompt based on a set of criteria related to the computer performance data and the user profile.

Also disclosed is a method for detecting intrusion and misuse of a computer in a computer network. The method includes the steps of collecting computer performance parameters from the computer, summarizing the collected computer performance parameters generating a user profile representing steady-state operation of the computer, collecting additional computer performance parameters, comparing the additional performance parameters and the user profile, and generating a prompt when the comparison exceed a set of criteria.

DESCRIPTION OF THE DRAWINGS

The detailed description will refer to the following drawings, in which like numerals refer to like objects, and in which.

DETAILED DESCRIPTION

Figure 1:
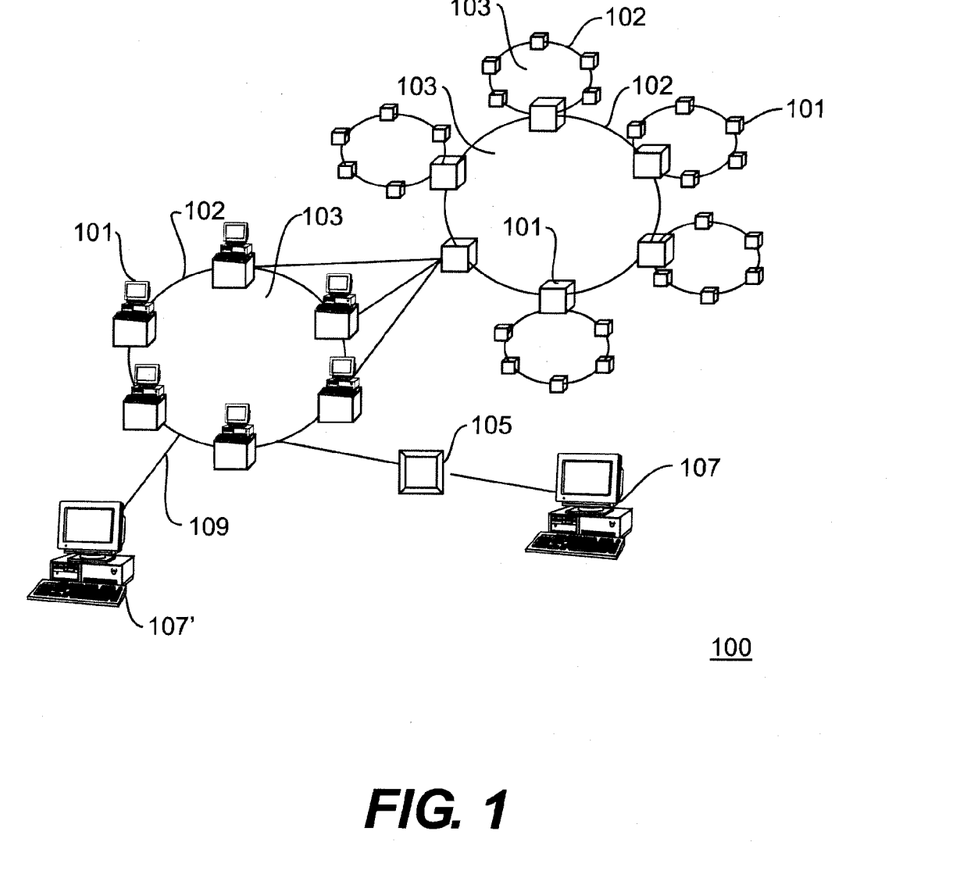
FIG. 1 illustrates a distributed computer network that includes intrusion and misuse detection.

Many distributed computer system networks are subject to an information warfare (IW) attack and compromise of information. FIG. 1 illustrates a network, configured as a local area network (LAN) 100, which may be subject to an IW attack. The LAN 100 includes multiple network devices 101, which are located at nodes on the LAN 100. The network devices 101 are linked by links 102 into subnets 103, and a series of the subnets 103 forms the LAN 100. The network devices 101 may be local client processors, such as servers and personal computers, for example. The LAN 100 may be an ARCnet, an Ethernet, and a Token-Ring network. The links 102 in the LAN 100 may be of any known physical configuration including unshielded twisted pair (UTP) wire, coaxial cable, shielded twisted pair wire, fiber optic cable, for example. Alternatively, the links 102 may be wireless links. The LAN 100 may also include dial-up remote access using a modem 105 to a remote client 107, and a dedicated port 109 to a remote client 107'.

Figure 2:
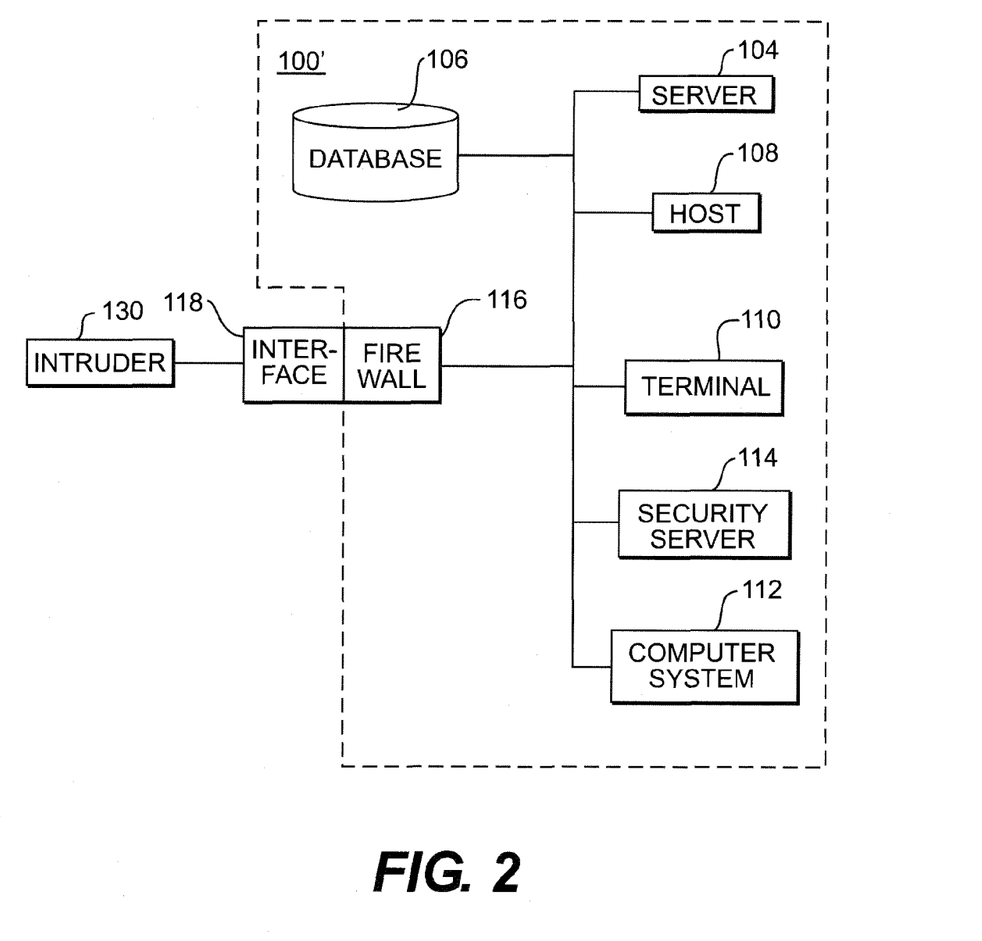
FIG. 2 is a diagram of a portion of the network of FIG. 1.

FIG. 2 is a diagram of a portion 100' of the LAN 100 showing specific features related to intrusion and misuse detection. The LAN portion 100' includes, as network devices 101, a network database server 104, database 106, a host computer 108, a terminal 110, and a computer system 112. Each network device 104, 106, 108, 110, 112 can also be considered a node because each network device has an addressable interface on the LAN 100. The computer system 112 may be any of personal computers, mini-mainframes, mainframes and the like. Although the computer system 112 is shown as a network device that is part of a wired local network, the computer system 112 may also be connected to the LAN 100 by a wireless link. In this regard, the computer system 112 is usable in mobile environments. As can be appreciated, many other devices can be coupled to the LAN 100 including personal computers, servers, mini-mainframe computers, mainframe computers, and other devices not illustrated or described, but which are well known in the art.

Also shown is security server 114 for implementing intrusion and misuse detection, suppression, countermeasures, and recovery from an IW attack. A firewall 116 connects the LAN portion 100' to an interface 118. The firewall 116 is a combination hardware and software buffer between the LAN portion 100' and external devices outside the LAN portion 100'. The network devices 101 within the LAN portion 100' appear within the dashed lines in FIG. 2, and external devices outside the LAN portion 100' appear outside the dashed lines in FIG. 2. The firewall 116 allows only specific kinds of messages from external devices to flow in and out of the LAN 100. As is known in the art, firewalls are used to protect networks such as the LAN 100 from intruders who might try to break into the LAN 100. The interface 118 is external to the LAN 100 and can be a modem, such as the modem 105 (see FIG. 1), or an Internet Protocol (IP) router, for example. The interface 118 connects the LAN 100 to devices outside the LAN 100. For illustrative purposes, an intruder computer system is shown at 130.

Figure 3:
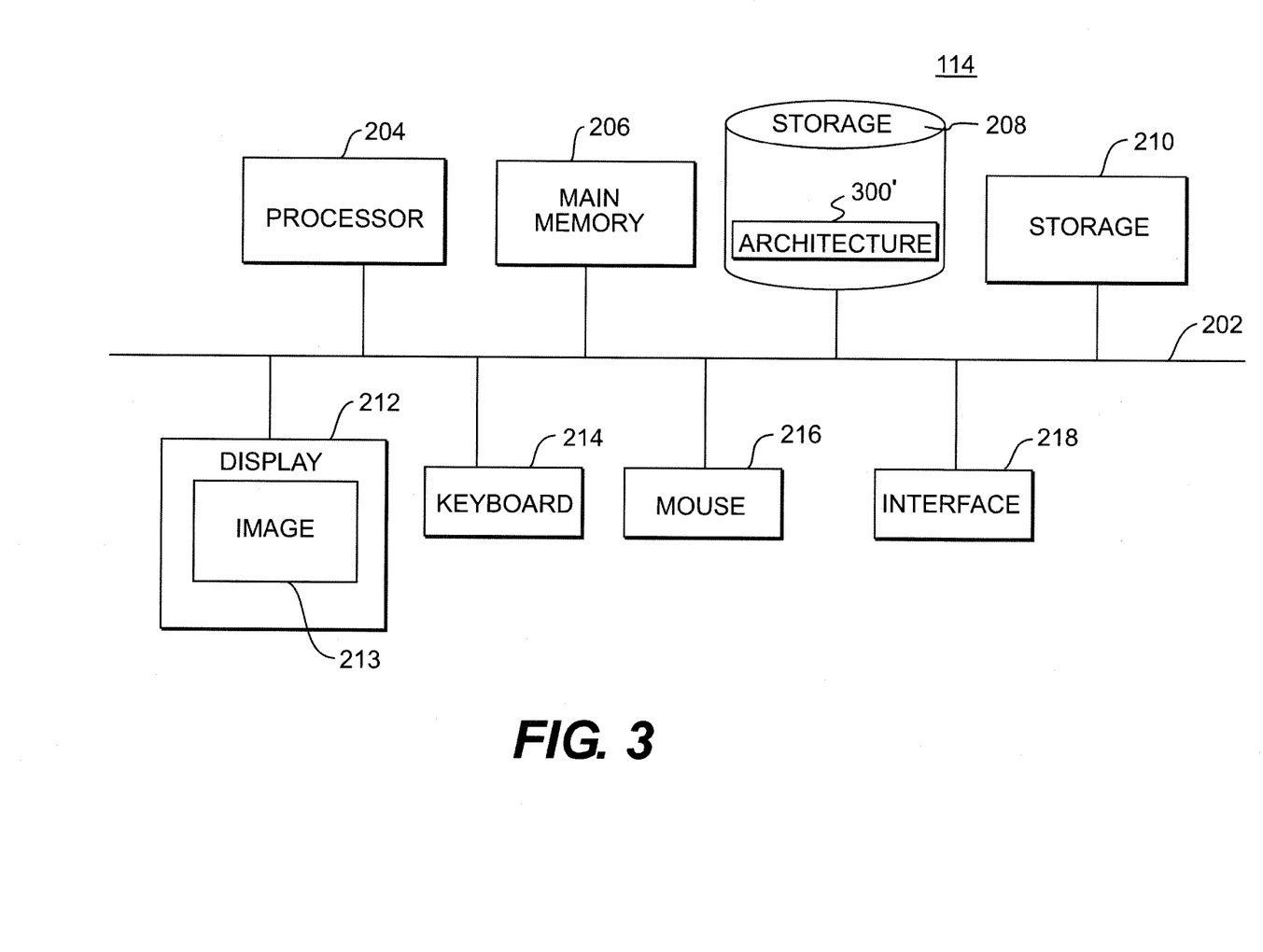
FIG. 3 is a block diagram of a security server used with the network portion of FIG. 2 to provide intrusion and misuse detection.

FIG. 3 is a block diagram of the security server 114, usable on the LAN 100 to provide intrusion and misuse detection, and other security features, including real-time recovery of the LAN 100 following an IW attack. The same features that are provided by the security server 114 may also be provided by the computer system 112, and by other network devices 101.

The security server 114 includes a bus 202 or other communication mechanism for communicating information, and a processor 204 coupled to the bus 202 for processing information. The security server 114 also includes a main memory 206, such as a random access memory (RAM) or other dynamic storage device, coupled to the bus 202 for storing information and instructions to be executed by the processor 204. The main memory 206 also may be used for storing temporary variables or other intermediate information during execution of instructions by the processor 204. The security server 114 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

As shown in FIG. 3, the ROM 208 includes software components of a security architecture 300' that may be implemented by the processor 204 to implement real-time intrusion and misuse detection, and to perform other security functions, including real-time recovery of the LAN 100 following an IW attack. Although the security architecture 300' is shown as stored in the ROM 208, the security architecture 300' could also be stored in other memory or storage devices of the security server 114. The security architecture 300' will be described in more detail later.

The security server 114 may be coupled using the bus 202 to a display 212, such as a cathode ray tube (CRT) or a flat panel display, for displaying information to a human operator. The display 212 may display a graphical image 213 that is used in conjunction with the security architecture 300' to "hide" certain information that the security architecture 300' will use in the event of a real-time recovery of the LAN 100. The graphical image 213 may be stored in a storage or memory device of the security server 114. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212.

The processor 204 can execute sequences of instructions contained in the main memory 206. Such instructions may be read into main memory 206 from another computer-readable medium, such as storage device 210 and the ROM 208. However, the computer-readable medium is not limited to devices such as storage device 210 and the ROM 208. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read. Execution of the sequences of instructions contained in the main memory 206 causes the processor 204 to perform process steps for detecting intrusion and misuse. In alternative embodiments, hard-wired circuitry may be used in place of or in combination with software instructions. Thus, the embodiments described herein are not limited to any specific combination of hardware circuitry and software.

The security server 114 also includes a communication interface 218 coupled to the bus 202. The communication interface 218 provides two-way data communication. For example, the communication interface 218 may be an integrated services digital network (ISDN) card or a modem to provide a data communication connection to a corresponding type of telephone line. As another example, the communication interface 218 may be a local area network (LAN) card to provide a data communication connection to the LAN 100. In an embodiment, the communication interface 218 is wired to the LAN 100. Wireless links may also be implemented. In any such implementation, the communication interface 218 sends and receives electrical, electromagnetic or optical signals, which carry digital data streams representing various types of information. Communications through communication interface 218 may permit transmission or receipt of the intrusion detection, suppression and countermeasure agents for taking countermeasures against suspected or actual unauthorized users.

Figure 4A:
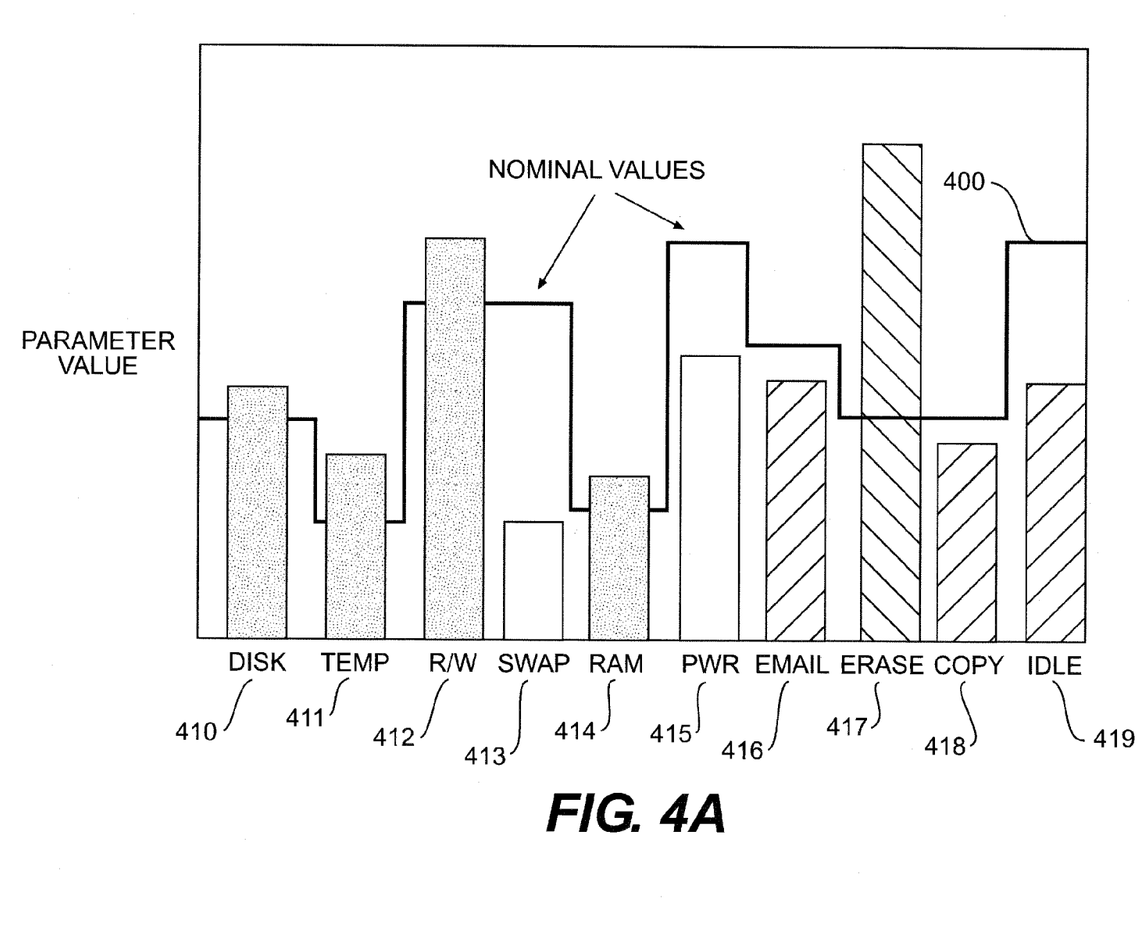
FIGS. 4A and 4B illustrate use of computer performance parameters in a security architecture for detecting computer intrusion and misuse.
Figure 4B:
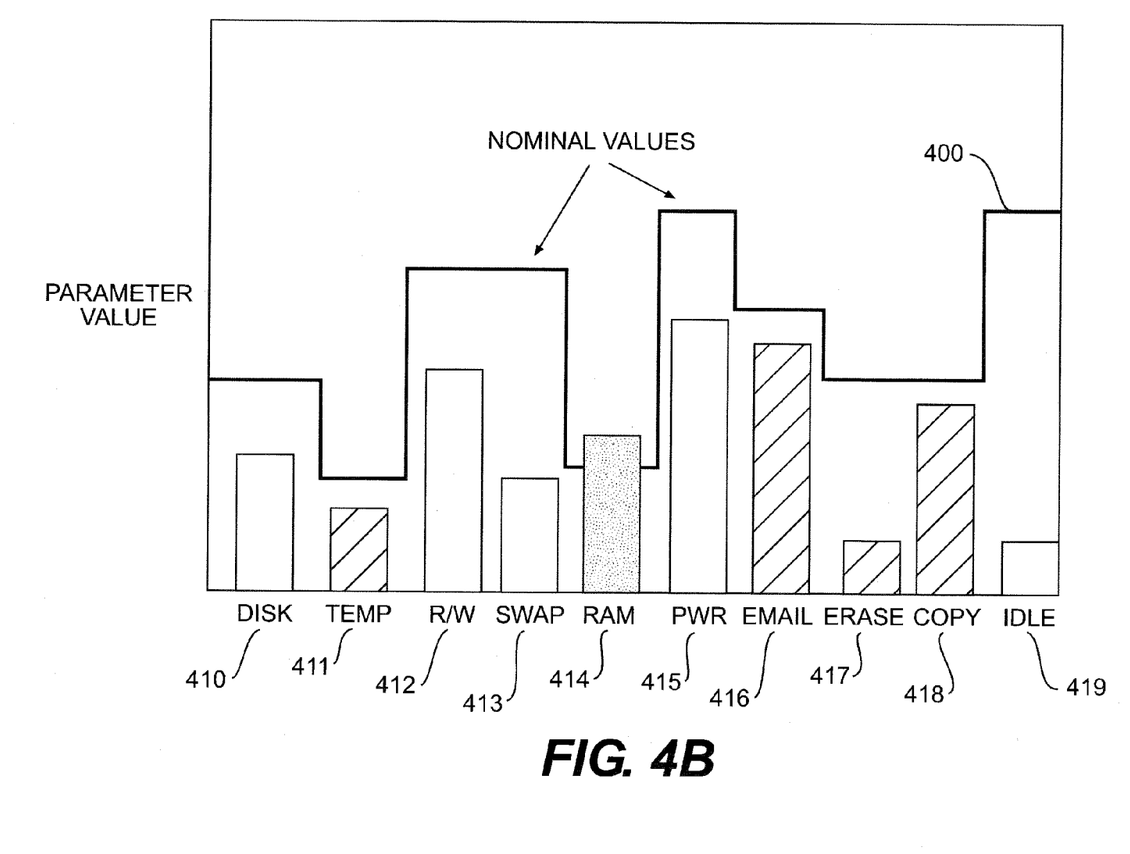

FIGS. 4A and 4B illustrate integration of LAN 100 performance parameters into the security architecture 300' to enable real-time detection of intrusion and misuse. In FIGS. 4A and 4B, a series of computer performance parameters are shown charted against a user profile 400. Each user in the LAN 100 may have a unique user profile, and the user's user profile 400 may change over time. The user profile 400 may be stored in a memory of the user's computer, and as such represents a local version 401 of the user profile 400. Another copy of the user profile 400 may be stored on a network storage device, and as such represents a network version 402 of the user profile 400. The local version 401 and the network version 402 may not be exactly the same. For example, the local version 401 may be updated based on actions taken at the user's computer. These same updates may be made to the network version 402, but a delay may occur between updating the local version 401 and the network version 402.

FIG. 4A shows ten computer performance parameters charted against the user profile 400: disk accesses (disk) 410, temperature (temp) 411, read/write cycles (R/W) 412, memory fetch cycles (swap) 413, memory store cycles (RAM) 414, power drawn (pwr) 415, e-mail transmissions (e-mail) 416, erase cycles (erase) 417, copy cycles (copy) 418, and idle cycles (idle) 419. Many other computer performance parameters could also be measured and profiled. The user profile 400 represents, for each of the ten parameters, a limit (e.g., a nominal value) for that parameter.

In FIG. 4A, the parameters disk 410, temp 411, R/W 412, and RAM 414 are shown slightly exceeding limits represented by the user profile 400. The parameter erase 417 is shown greatly exceeding the limit represented by user profile 400. The parameters swap 413 and pwr 415 are shown within the limits represented by the user profile 400, and are steady. The parameters e-mail 416, copy 418, and idle 419 are shown within the limits represented by the user profile 400, but are rising.

The comparison of the charted parameters 410-419 to the limits represented by the user profile 400 indicates excessive disk accesses with many read/write operations. Coupled with the high number of erasures, analysis of the situation shown in FIG. 4A indicates purging of memory of the user's computer. Such purging may indicate computer misuse or intrusion, and can be used to signify to security components of the network to which the user's computer is connected that actions should be taken. In addition, five of the measured ten parameters 410-419 exceed the limits represented by the user profile 400, which also is indicative of a possible computer misuse or intrusion.

In an embodiment, computer intrusion and misuse is indicated when any one of the parameters 410-419 exceeds its corresponding limit represented the user profile by 50 percent. Computer intrusion and misuse is also indicated when the parameters 410-419 show a cumulative out of bounds (i.e., greater than the limits represented by the user profile 400) value of more than 50 percent (e.g., four parameters each exceed greater than 15 percent). Computer intrusion and misuse may also be indicated when certain parameters exceed limits represented by the user profile 400 by an amount that cumulatively is less than 50 percent. For example, if copy 418 and erase 417 both exceed their respective limits represented by the user profile 400, computer intrusion or misuse may be indicated.

FIG. 4B illustrates a situation in which only one of the ten parameters 410-419 exceeds a limit represented by the user profile 400. Specifically, RAM 414 exceeds the limit for RAM represented by the user profile 400. In addition, temp 411, e-mail 416, erase 417, and copy 418 are rising. This relationship between RAM 414, temp 411, e-mail 416, erase 417, and copy 418 may be considered an unusual pattern of operation of the user's computer, and may indicate intrusion or misuse. One possible explanation for this situation is multiple copying and e-mailing. Although this situation may indicate a problem, the situation may call for actions that are different from those called for by the situation shown in FIG. 4A.

One of ordinary skill in the art will appreciate that many other unusual patterns of computer operation may be indicated by the values measured from the parameters 410-419, even when none of the parameters 410-419 exceed limits represented by the user profile 400.

In addition to comparing specific computer parameters, such as the parameters 410-419, to the limits represented by the user profile 400, the LAN 100 may implement a regime of comparing the local version 401 of the user profile 400 to the network version 402. Such a comparison should show few differences. If the profiles differ sharply, such a situation may indicate a computer misuse or intrusion. In an embodiment, a difference of greater than ten percent between the local version 401 of the user profile 400 and the network profile 402 is used to indicate a possible intrusion or misuse. Such a difference in profiles may indicate that a user has altered the local profile 401 in an attempt to prevent monitoring of the parameters 410-419 from showing an out-of-limits condition.

Figure 5A:
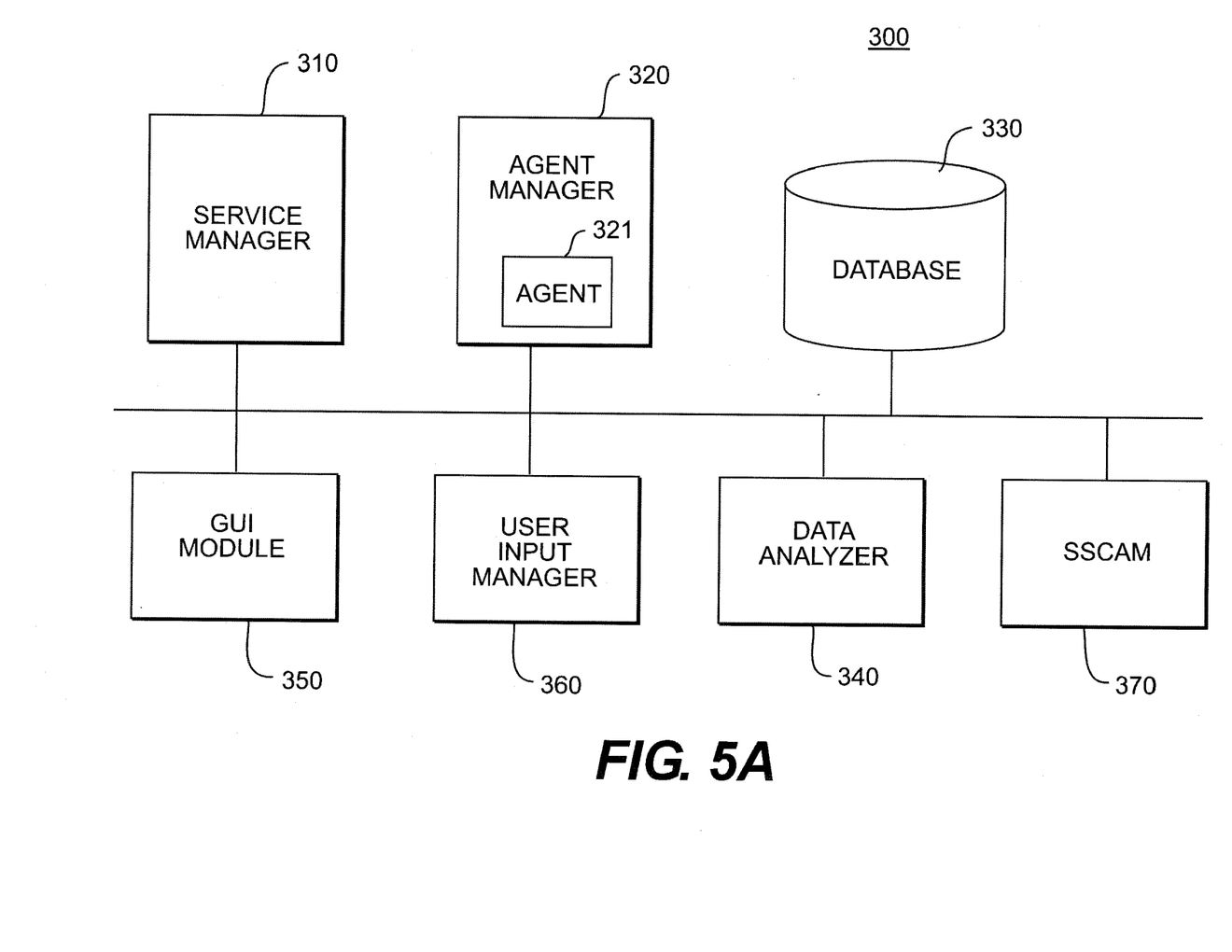
FIGS. 5A-5D are block diagrams of a program architecture, operable on a device of the network of FIG. 1, for detecting computer intrusion and misuse.

FIG. 5A is a block diagram of a security architecture 300 including its software components, operable on a network device 101 of the LAN 100, such as the computer system 112 and the security server 114, for executing intrusion and misuse detection routines. The security architecture 300 includes hardware and software components. As shown in FIG. 5A, the software components of the architecture 300 include a service manager 310, an agent manager 320, a database 330, a data analyzer 340, a graphical user interface module 350, a user input manager 360, and software components of a steady state computer abuse monitor (SSCAM) 370. The steady state computer abuse monitor 370 will be described in detail with reference to FIG. 5B. The service manager 310 determines a frequency of monitoring computers and other network devices 101 coupled to the LAN 100 for indications of intrusion and misuse. The monitoring frequency may be the same for all subnets 103 and all network devices 101. Alternatively, the monitoring frequency may vary depending on many factors such as use of a specific network device 101 and changes in a threat environment, for example.

The agent manager 320 controls software agents 321 that may be used to collect computer performance parameters, such as the parameters 410-419 shown in FIGS. 4A and 4B. Use of software agents to collect computer performance parameters is well know in the art. The collected performance parameters 410-419 represent instantaneous values, which may subsequently be used to compute steady state values and longer term trends.

The database 330 stores the collected computer performance parameters 410-419. The database 330 may also be used to store any data derived from these parameters. When installed on the computer system 112, the database 330 may store the local version 401 of the user profile 400. When installed on the security server 114, the database 330 may store the network profile 402. The database 330 may also store historical values of the computer performance parameters 410-419 and the user profile 400 for use in later reconstruction of an IW attack.

The data analyzer 340 uses the collected and stored performance parameters to generate long-term trends and steady state values for the computer performance parameters 410-419. The data analyzer 340 also may initially create, and then update the user profile 400. To create the user profile 400, the data analyzer may invoke an "expected" user profile based on historical usage patterns. This initial user profile can then quickly be updated to match the actual usage patterns of the individual user. Once the user profile 400 is established, the data analyzer 340 reviews long term usage patterns of the individual user, and periodically updates the user profile 400.

The GUI module 350 controls a graphical user interface that is used to display information to a human operator. The user input manager 360 receives user inputs and directs those inputs to specific components of the architecture 300 for execution. In an embodiment, the GUI module 350 and the user input manager 360 are installed on the security server 114, but are not installed on the computer system 112. In this embodiment, a user of the computer system 112 would, therefore, be prevented from easily accessing the other routines of the architecture 300. As will be described later, using the user input manager 360, a human operator can override decisions of the steady state computer abuse monitor 370 in determining if specific actions are required in a response to a comparison of the computer performance parameters 410-419 and the limits represented by the user profile 400.

Figure 5B:
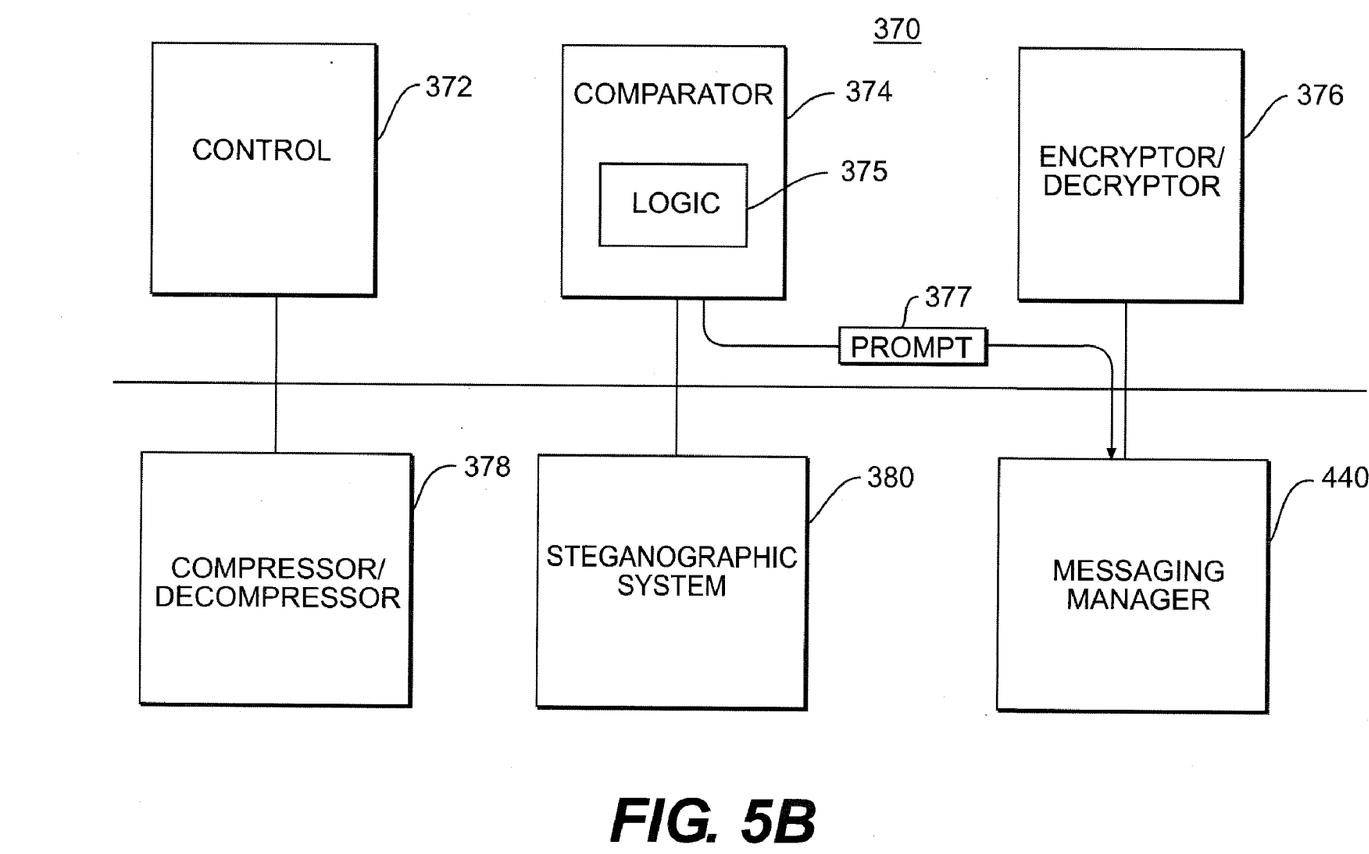

FIG. 5B is a block diagram of the steady state computer abuse monitor (SSCAM) 370. The SSCAM 370, which includes hardware and software components, receives the computer performance parameters 410-419 and the user profile 400 from the database 330. As shown in FIG. 5B, the SSCAM 370 includes, as software components, a control module 372 that controls processing by components of the SSCAM 370, a comparator 374 that compares the limits represented by the user profile 400 and the computer performance parameters 410-419, an encryptor/decryptor 376 that encrypts and decrypts the computer performance parameters 410-419 and the user profile 400, and a compressor/decompressor 378 that compresses and decompresses the encrypted/decrypted computer performance parameters 410-419 and the user profile 400. The SSCAM 370 also includes a steganographic system 380 that "hides" the compressed performance parameters 410-419 and the user profile 400, and a messaging manager 440 that provides messaging functions in the LAN 100. The steganographic system 380 and the messaging manager 440 will be described in detail with reference to FIGS. 5C and 5D, respectively.

The comparator 374 compares the computer performance parameters 410-419 measured by the software agents 321 to the limits represented by the user profile 400 and determines when the comparison warrants taking action. The comparison includes analysis of specific parameters that are below the user profile 400 limit, but that are increasing, and comparison of parameters that exceed the user profile 400 limit. In addition, the comparator 374 includes logic 375 to analyze the relationship between the measured computer performance parameters to determine if the measured values indicate a specific type of problem. Referring again to FIG. 4A, the comparison of the charted parameters 410-419 to the user profile 400 indicates excessive disk accesses with many read/write operations. Coupled with the high number of erasures, analysis of the situation shown in FIG. 4A indicates purging of memory of the user's computer. Such purging may indicate computer misuse or intrusion, and can be used to signify to security components of the network to which the user's computer is connected that action should be taken. Once a determination is made, the comparator 374 then may suggest taking a specific action by providing a prompt 377 to the messaging manager 440. The prompt 377 may indicate the nature of the situation and a suggested action to minimize harm to the LAN 100.

When implemented in the users' computer, such as the computer system 112, the comparator 374 compares the computer performance parameters 410-419 to the local version 401 of the user profile 400. When implemented in the security server 114, the comparator 374 compares the computer performance parameters 410-419 to the network version 402 of the user profile 400. In addition, when implemented on the security server 114, the comparator 374 compares the local version 401 of the user profile 400 to the network version 402.

Figure 5C:
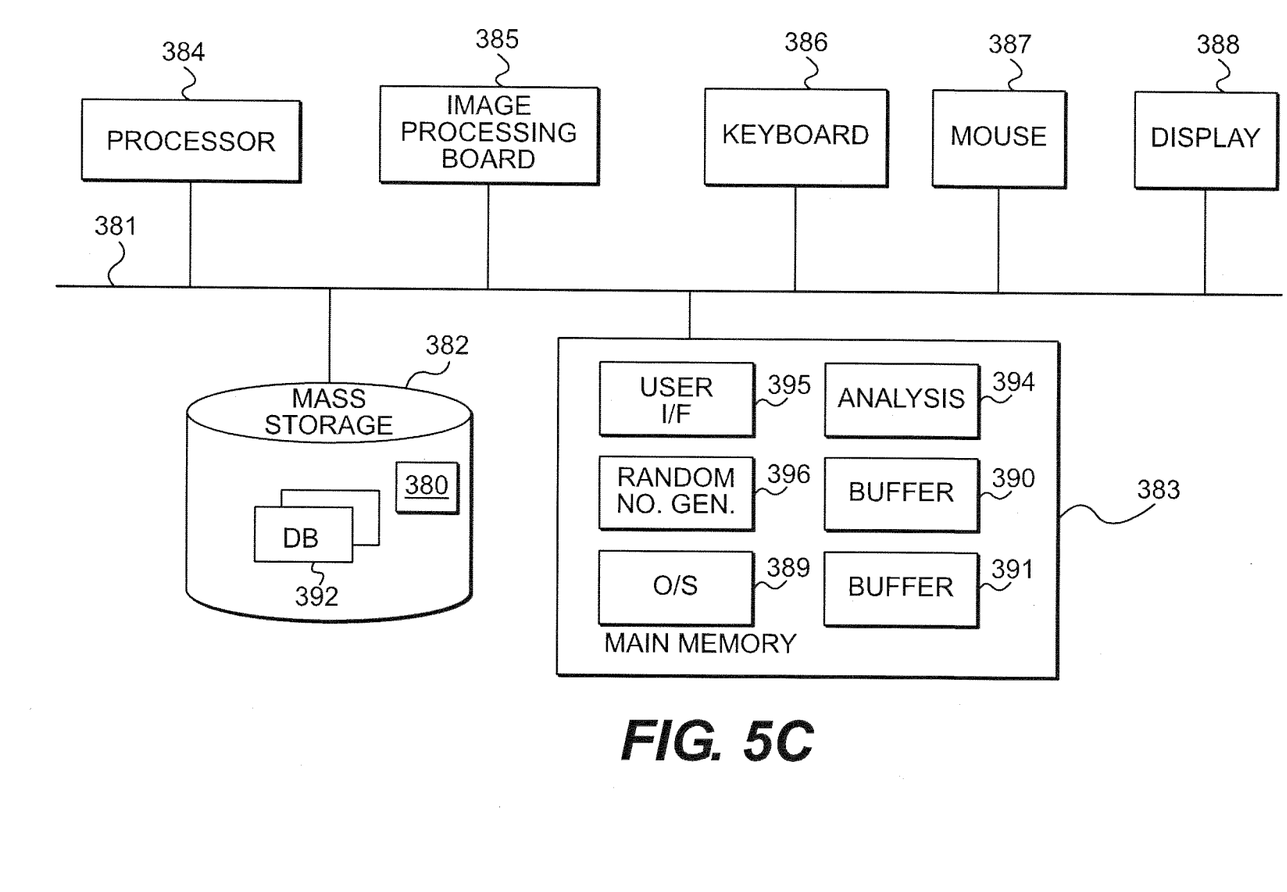

FIG. 5C shows the steganographic system 380 as part of an embodiment of the security server 114. Various hardware components shown in FIG. 5C correspond to those shown in FIG. 3. The steganographic system 380 uses steganography to "hide" data, such as the compressed performance parameters 410-419 and the user profile 400, so that the data are less susceptible to an IW attack.

Steganography, or data hiding, is a class of processes used to embed recoverable data in digitally represented information, such as a host image, with minimal degradation to the host information. In the context of the LAN 100, the goal of data hiding is to insulate the computer performance parameters 410-419 and the user profile 400 from access and alteration by an intruder or misuser of the LAN 100.

After receiving the computer performance parameters 410-419 and the user profile 400, the encoded image may undergo intentional and inadvertent modification due, for example, to channel noise, filtering, resampling, rotation, cropping, lossy compression, or digital-to-analog (or analog-to-digital) conversion. In order to be effective, the data hiding technique embeds the computer performance parameters 410-419 and the user profile 400 in a manner that allows determination of its presence or absence even after such modifications.

In an embodiment, the steganographic system 380 embeds one bit, or a pattern of bits, indicating the presence or absence of the computer performance parameters 410-419 and the user profile 400, in a host image in a manner that allows detection of the bit, or pattern of bits, by exploiting the behavior of sums of a large number of random variables. Specifically, the data-embedding technique requires altering characteristic parameter values at a set of pseudo-randomly chosen locations in the host image in a manner that markedly changes the expectation value of some linear combination of mathematical functions of the values at that set of locations. The embedded computer performance parameters 410-419 and the user profile 400 are recoverable from an image by calculating an experimental value of a linear combination of a large number of instances of the functions and comparing the experimental value with the expectation value of the sum for the unaltered host image. Many other data hiding techniques are available for embedding the computer performance parameters 410-419 and the user profile 400 in another digital data file. Such techniques are well known in the art, examples of which are taught in U.S. Pat. Nos. 6,314,192, 6,301,360, and 6,252,963, the disclosures of which are hereby incorporated by reference.

The embedding is done by first randomly selecting a large number of locations in the host image, for example by associating locations in the image with members of a series of pseudo-random numbers. In the general case, the locations are partitioned into first and second groups. The host image is then altered by increasing the values of the characteristic parameter at locations belonging to the first group and decreasing the values of the same parameter at locations belonging to the second group. For digitally encoded images, the locations correspond to groupings of adjacent pixels.

Decoding entails determining whether or not an image includes the embedded pattern. To decode, the selection and partition of locations generated during the embedding process is recreated, for example, by supplying a key specific to the pattern to a pseudo-random number generator and then applying the partition procedure. The decoder then calculates an experimental value of a test statistic, formulated to reflect the alterations to the host image associated with the statistic, of the parameter values assessed at the selected locations in the image. Generally, the test statistic is equivalent to a linear combination of many instances of respective functions of the parameter values of locations belonging to the first and second groups. For example, since the parameter values of the first group locations are all increased and those of the second group all decreased, an appropriate function would be the difference between the sums of the parameter values over the first and second group locations. This calculation does not require the decoder to have the host image.

If the probability density functions of the parameter at all locations have finite expected value and variance and are identical and independent of the values assumed at other locations, then a test statistic equal to the sum of a large number of instances of a linear combination of the parameters assumes a Gaussian form. This property facilitates determining quantitatively whether the observed value of the test statistic indicates operation of the probability density function associated with the unaltered host image or of the shifted density associated with the embedded pattern. A Gaussian description may be appropriate even for statistics that do not conform to the restrictions just listed. Furthermore, even a non-Gaussian statistic can adequately differentiate between an unshifted and a shifted probability density function. The likelihood of an observed experimental value's belonging to a density of known expected value can be bounded using the Chebyshev inequality, for example.

The reliance of the decoding on the statistical properties of combinations of many numbers renders the embedded computer performance parameters 410-419 and the user profile 400 resistant to defeat by degradation of the image carrying the pattern. The express knowledge of the location selection and partition as well as of the specific alteration to the parameter values that is required to reverse the encoding makes the embedded bit resistant to intentional removal from the altered host image. Applying the changes to pixel groupings protects the embedded bit from obliteration by lossy compression, tone correction, filtering, cropping, and affine transformation.

In FIG. 5C, an embodiment of the steganographic system 380 is shown to be stored in a mass storage device (such as a hard disk or optical storage unit) 382 and connected to a system bus 381, over which all system components communicate, and a main system memory 383.

A processor 384 controls operation of the steganographic system 380 and its components. To facilitate rapid execution of the image-processing operations, the steganographic system 380 also uses an image-processing board 385.

In an embodiment, the steganographic system 380 is automated using the processor 384 to embed the computer performance parameters 410-419 and the user profile 400 in a host image on a network device 101 of the LAN 100. Alternately, a human operator can interact with the steganographic system 380 using a keyboard 386 and a position-sensing device (e.g., a mouse) 387. The output of either device 386 or 387 can be used to designate information or select particular areas of a screen display 388 to direct functions to be performed by the steganographic system 380.

The main memory 383 may store software components of the steganographic system 380, such as a group of software modules that control the operation of processor 384 and its interaction with the other components. An operating system 389 directs the execution of low-level, basic system functions such as memory allocation, file management and operation of mass storage unit 382. At a higher level, an analysis module 394, implemented as a series of stored instructions, directs execution of the primary functions performed by the steganographic system 380. Instructions defining a user interface 395 allow straightforward interaction over the display 388. A user interface 395 generates words or graphical images on the display 388 to prompt action by the user, and accepts user commands from the keyboard 386 and/or position-sensing device 387. A random number generator 396 creates the ordered series of pseudo-random numbers used in encoding or decoding.

The main memory 383 also includes one or more input image buffers 390 that contain image(s), such as a host or test image, used as input for processing the computer performance parameters 410-419 and the user profile 400, and output image buffers 391 that contain an output image generated by that processing. The contents of each input or output image buffer 390 and 391 define a raster, i.e., a regular two-dimensional pattern of discrete pixel positions that collectively represent an image and may be used to drive (e.g., by means of image-processing board 385) the display 388 to display that image. The values of pixel parameters, such as luminance, contained at each memory location in the image buffers 390 or 391 directly governs the appearance of a corresponding pixel on the display 388.

One or more databases 392 contain encoding and/or decoding information, e.g., the output of the random number generator 396, the key used by the random number generator 396 to generate the pseudo-random number series, the role governing assignment of pixels to groups, the description of groups, the test statistic formulation, and expected value or descriptions of geometric transformation. One or more of the databases 392 may be associated with each one of the image buffers 390 or 391 and contain information specific to the image contained in the associated buffer; or, one database 392 may contain information generic to all images encoded or decoded by the steganographic system 380. The databases 392 may be stored in the mass storage device 382 in file(s) linked to file(s) containing the associated image(s).

Figure 5D:
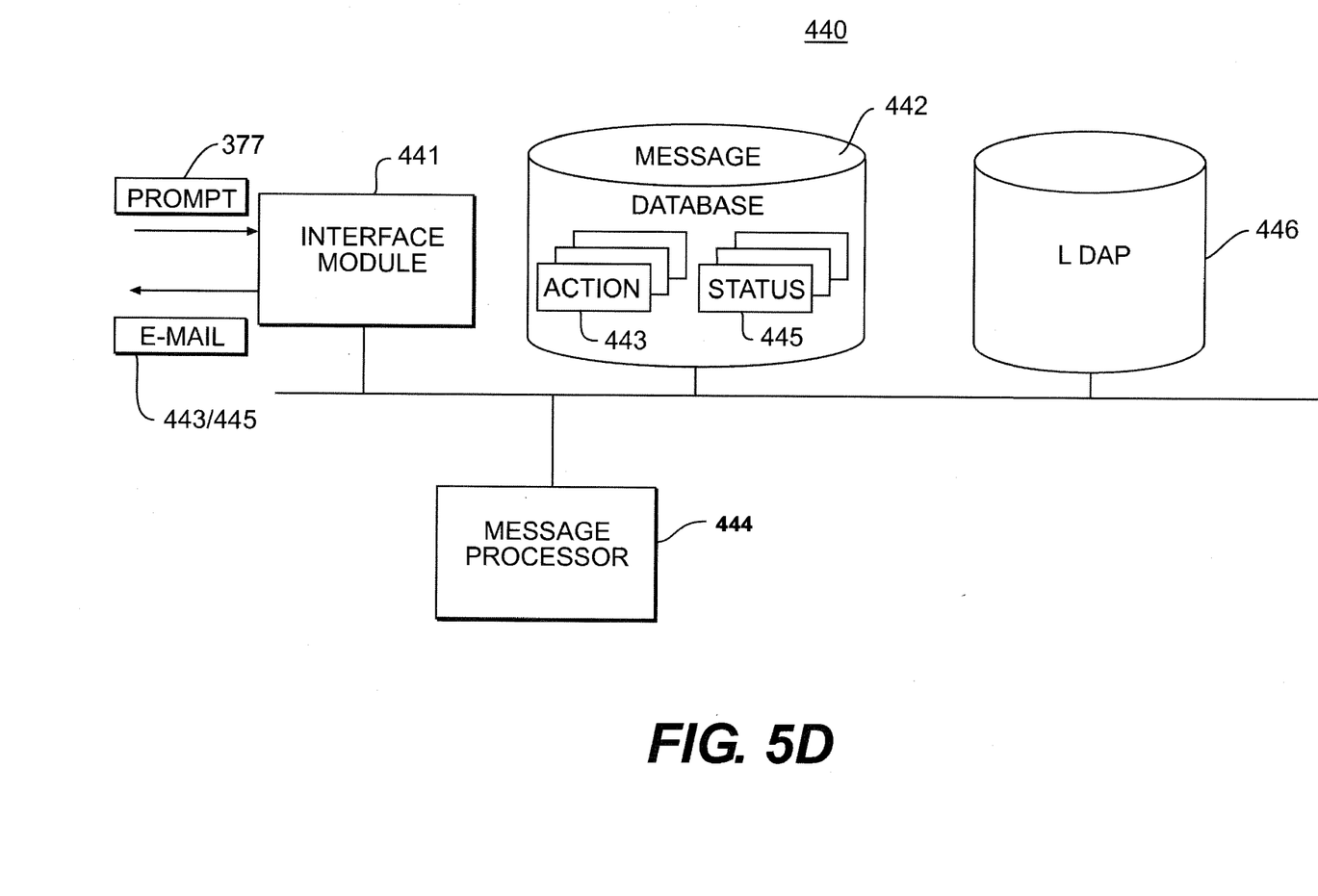

FIG. 5D is a block diagram of the messaging manager 440. The messaging manager 440 receives inputs from the comparator 374, and formulates and forwards status and action messages to other components and nodes in the LAN 100. The messaging manager 440 includes an interface module 441, a message database 442, a message processor 444, and a Lightweight Directory Access protocol (LDAP) database 446. The interface module 441 receives prompts 377 from the comparator 374. The prompts 377 are cross-referenced to a series of action messages 443 and status messages 445 that are stored in the message database 442. In the situation illustrated in FIG. 4B, the prompt 377 may indicate that a status message 445 should be sent to a security administrator (i.e., a human operator) in the LAN 100. The message processor 444 reviews the prompt 377 and selects the appropriate status message 445 from the message database 442. The message processor 444 then consults the LDAP database 446 to verify the correct e-mail address (or other means of contact) of the security administrator, and inserts the security administrator's e-mail address in the message header. The interface module 441 then sends the status message 445 to the security administrator. In the situation illustrated in FIG. 4A, the prompt 377 may suggest a specific action be taken, such as disconnect the user's computer from the LAN 100, for example. The associated action message 443 may automatically direct the execution of this action, and may simultaneously notify the LAN 100 security administrator of the action taken. In an embodiment, the action message 443 may be pending in the LAN 100 until a specific direction from the security administrator is received by the message processor 444 to proceed with the suggested action. For example, the security administrator may be required to send an e-mail response back to the message processor 444 before the user's computer is isolated.

One of ordinary skill in the art will understand that the modules of the architecture 300 have been described separately for clarity of presentation only. So long as the architecture 300 performs all necessary functions, the distribution of the various modules is immaterial.

Figure 6A:
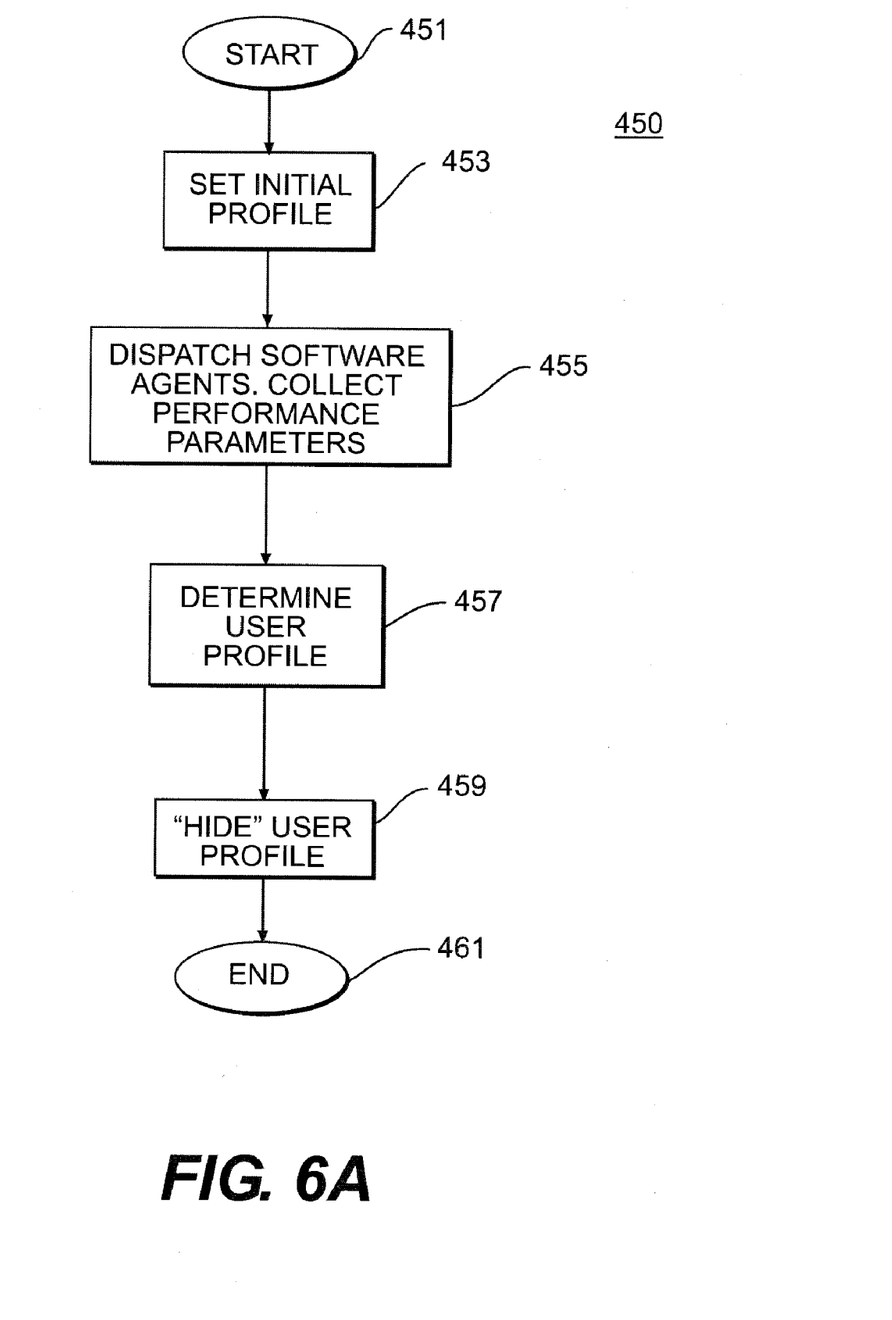
FIGS. 6A and 6B are flowcharts illustrating a method of detecting computer intrusion and misuse.

FIG. 6A is a flowchart of a process 450 for establishing a user profile. The process 450 beings in block 451. In block 453, the data analyzer 340 sets an initial user profile for a user. In block 455, the agent manager 320 dispatches software agents 321 to collect computer performance parameters from the user's computer. The software agents 321 may reside on the user's computer until sufficient numbers of measurements are completed to allow the data analyzer 340 to determine the user profile. In block 457, the data analyzer 340 receives the collected performance parameters and determines the user profile for the user. The user profile is then encrypted and compressed, and is "hidden" by the steganographic system 380, block 459. The process 450 then ends, block 461.

Figure 6B:
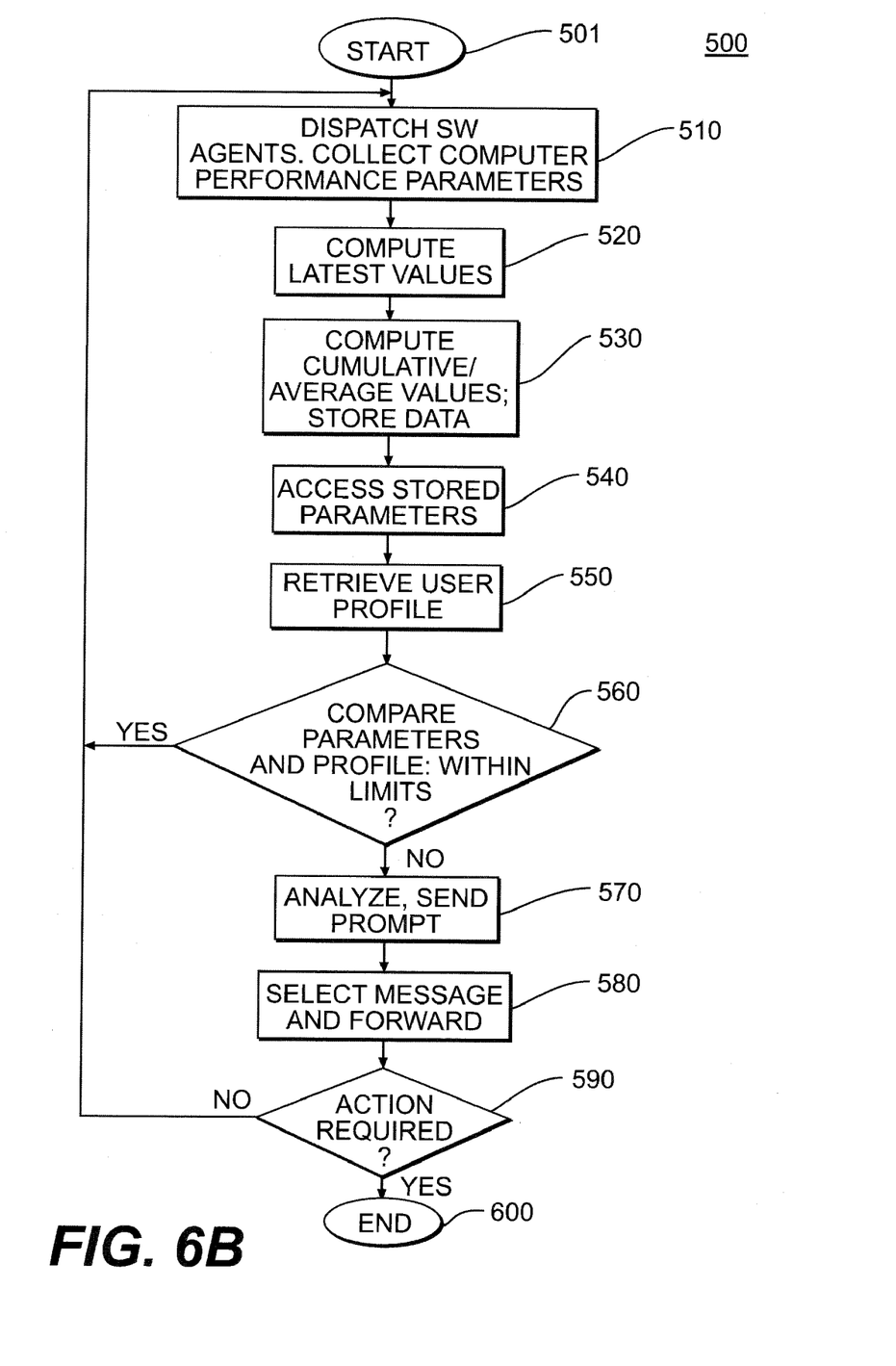

FIG. 6B is a flowchart illustrating a process 500 executed according to the architecture 300 on the security server 114 to detect misuse and intrusion of the LAN 100. The process 500 begins in block 501. In block 510, the agent manager 320 on the computer system 112 dispatches software agents 321 to collect computer performance parameters 410-419 from the computer system 112. In block 520, the collected computer performance parameters 410-419 are provided to the data analyzer 340, which computes a latest value for these parameters. For example, a software agent 321 may collect disk access data from the computer system every second, and provide that information to the data analyzer 340. The data analyzer 340 computes, block 530, an average or cumulative number of disk accesses based on data collected over a specific time. The data analyzer 340 may compute the cumulative disk accesses for each hour of operation of the computer system 112, and may store this data in the database 330. The disk analyzer 340 may also parse the disk access data by day of week, shift of operation, and other means.

Periodically, the SSCAM 370 operating on the security server 114 may access the collected data in the database 330 of the computer system 112, block 540. The SSCAM 370 then retrieves the network profile 402, block 550. In block 560, the comparator 374 compares the collected data to the network profile 402 and determines if the data are within limits with respect to the network profile 402. If the data are within limits, the process 500 returns to block 510.

In block 560, if the data exceed limits represented by the network profile 402, then the comparator 374 analyzes the situation and sends a prompt 377 to the messaging manager 440, block 570. In block 580, the message processor 444 selects an appropriate message 443/445 from the message database 442, and forwards the message to the designated addressee(s). The message processor 444 determines if the message requires isolation of the computer system 112, or similar action, block 590. In block 590, if the message requires such action, the process 500 moves to block 600 and ends. In block 590, if the computer system 112 is to remain online, the process 500 returns to block 510.

Other features of a steady state computer intrusion and misuse detection system and method are disclosed in copending applications assigned to the instant assignee and filed on May 14, 2003, under application Ser. No. 10/437,019, entitled "System and Method for Real-Time Network-Based Recovery Following an Information Warfare Attack" and under application Ser. No. 10/437,048, entitled "Real-Time Recovery of Compromised Information," both applications which are currently pending and the disclosures of which are hereby incorporated by reference.

I claim:

1. A computer-implemented system for detecting intrusion and misuse of a computer in a computer network including a security server, the system comprising:
    a processor; and
    a memory coupled to the processor, the memory storing machine instructions comprising the following routines:
        an agent manager that directs actions of software agents to collect computer performance parameters from the computer;
        a data analyzer that summarizes the collected computer performance parameters and generates a user profile, wherein the user profile comprises a local version stored on the computer and a network version stored on the security server; and
        a comparator that compares additional computer performance data and the user profile and generates a prompt based on one or more criteria related to the computer performance data and the user profile, wherein the prompt provides suggested actions for subsequent operation of the computer to minimize harm to the computer network, wherein the comparator further compares the local version of the user profile and the network version of the user profile, and a difference of greater than 10% between one or more pairs of corresponding values in the local version and the network version indicates a possible intrusion or misuse.

2. The system of claim 1, further comprising a steganographic system that hides the summarized computer performance data and the user profile in an image.

3. The system of claim 1, further comprising a message manager that receives the prompt, the message manager, comprising:
    a message database that comprises messages referenced to the prompt; and
    a message processor that sends messages to components of the computer network.

4. The system of claim 3, wherein the messages comprise action messages and status messages, and wherein the action messages comprise commands for execution by components of the network.

5. The system of claim 4, wherein the commands include a command to shutdown the computer.

6. The system of claim 1, wherein the criteria include performance parameters that exceed limits represented by the user profile.

7. The system of claim 1, wherein the criteria include performance parameters that, in relationship to other collected and summarized performance parameters, indicate an unusual pattern of operation of the computer.

8. The system of claim 1, wherein the user profile comprises a steady-state indication of operation of the computer.

9. The system of claim 1, wherein the routines further comprise a service manager in communication with the agent manager that determines a frequency of collection of the computer performance parameters.

10. The system of claim 1, wherein the data manager updates the user profile.

11. The system of claim 1, wherein the agent manager, the data analyzer, and the comparator reside on the computer.

12. A computer-implemented method for detecting intrusion and misuse of a computer in a computer network, comprising:
    collecting computer performance parameters from the computer;

summarizing the collected computer performance parameters;

generating a user profile representing steady-state operation of the computer, wherein the user profile comprises a local version stored on the computer and a network version stored on a security server of the computer network;

collecting additional computer performance parameters;

comparing the additional performance parameters and the user profile;

generating a prompt when the comparison exceeds one or more criteria, wherein the prompt provides suggested action for subsequent operation of the computer to minimize harm to the computer network; and comparing the local version of the user profile and the network version of the user profile, wherein a difference of greater than 10% between one or more pairs of corresponding values in the local version and the network version indicates a possible intrusion or misuse.

13. The method of claim 12, further comprising hiding the user profile and the additional performance parameters in a digital file.

14. The method of claim 13, further comprising:
receiving the prompt at a message manager;
executing an additional comparison comparing the prompt to a series of status and action messages, wherein action messages comprise a command;
selecting one or more appropriate status messages and action messages based on the additional comparison; and
sending the selected messages to one or more nodes in the computer network.

15. The method of claim 14, further comprising, when an action message is received at a node in the computer network, carrying out the command.

16. The method of claim 12, wherein the criteria include performance parameters that exceed limits represented by the user profile.

17. The method of claim 12, wherein the criteria include performance parameters that, in relationship to other collected and summarized performance parameters, indicate an unusual pattern of operation of the computer.

18. The method of claim 12, wherein the user profile comprises a steady-state indication of operation of the computer.

19. The method of claim 12, further comprising determining a frequency of collection of the computer performance parameters.

20. The method of claim 12, further comprising updating the user profile.

21. The method of claim 12, further comprising:
providing the local version of the user profile;
hiding the local version on the computer;
providing the network version of the user profile; and
hiding the network version on a network device different from the computer.

22. A tangible, non-transitory computer readable storage medium comprising instructions for detecting intrusion and misuse of a computer in a computer network, the instructions comprising:
collecting computer performance parameters from the computer;
summarizing the collected computer performance parameters;
generating a user profile representing steady-state operation of the computer, wherein the user profile comprises a local version stored on the computer and a network version stored on a security server of the computer network;
collecting additional computer performance parameters;
comparing the additional performance parameters and the user profile;
generating a prompt when the comparison exceeds one or more criteria, wherein the prompt provides suggested action for subsequent operation of the computer to minimize harm to the computer network; and
comparing the local version of the user profile and the network version of the user profile, wherein a difference of greater than 10% between one or more pairs of corresponding values in the local version and the network version indicates a possible intrusion or misuse.

23. The tangible, non-transitory computer readable medium of claim 22, wherein the instructions further comprise hiding the user profile and the additional performance parameters in a digital file.

24. The tangible, non-transitory computer readable medium of claim 23, wherein the instructions further comprise:
receiving the prompt at a message manager;
comparing the prompt to a series of status and action messages, wherein action messages comprise a command;
selecting one or more appropriate status messages and action messages based on the comparison of the prompt to the series of status and action messages; and
sending the selected messages to one or more nodes in the computer network.

25. The tangible, non-transitory computer readable medium of claim 24, wherein the instructions further comprise, when an action message is received at a node in the computer network, carrying out the command.

* * * * *